G. WALKER.
WEIGHING MACHINE.
APPLICATION FILED APR. 13, 1911.

1,103,456.

Patented July 14, 1914.

WITNESSES:
M. A. Shuckerow
Louis Lucia

INVENTOR.
George Walker.
BY
A. E. Hart
his ATTORNEY.

UNITED STATES PATENT OFFICE.

GEORGE WALKER, OF NEW BRITAIN, CONNECTICUT, ASSIGNOR TO LANDERS, FRARY & CLARK, OF NEW BRITAIN, CONNECTICUT, A CORPORATION OF CONNECTICUT.

WEIGHING-MACHINE.

1,103,456.  Specification of Letters Patent.  Patented July 14, 1914.

Application filed April 13, 1911.  Serial No. 620,884.

*To all whom it may concern:*

Be it known that I, GEORGE WALKER, a citizen of the United States, and a resident of New Britain, in the county of Hartford, State of Connecticut, have invented certain new and useful Improvements in Weighing-Machines.

My invention relates to improvements in weighing scales and particularly to spring scales of the rack and pinion class, the object of the invention being to provide a simple and easily accessible mechanism by means of which the scale can be accurately adjusted after it is assembled so that it will weigh correctly under varying conditions of use.

Figure 1:
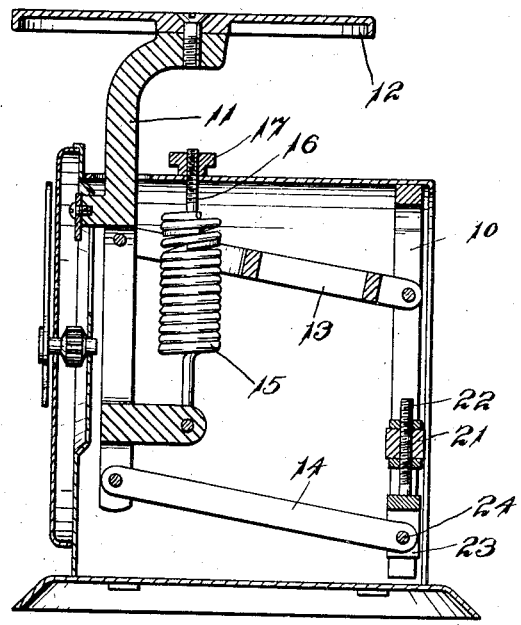
Figure 2:
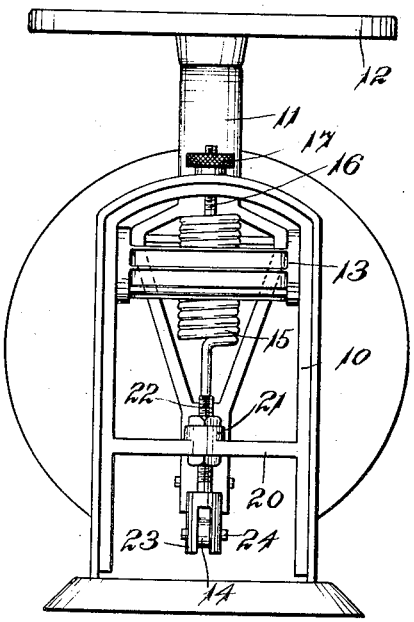
Figure 3:
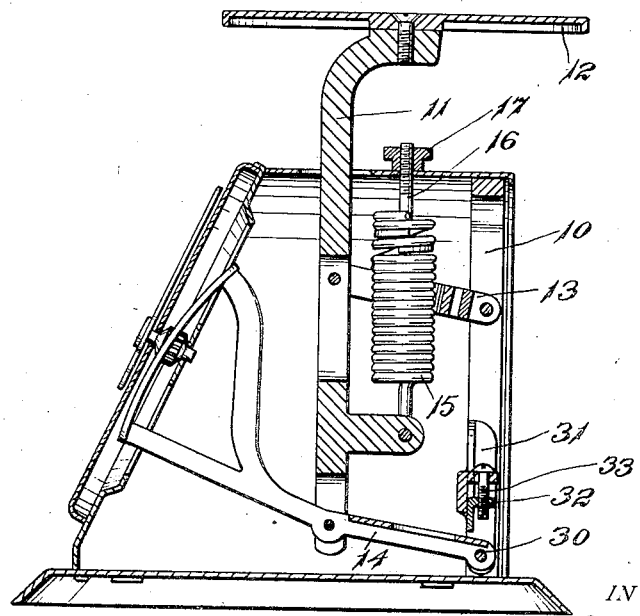

In the drawings—Figure 1 is a sectional view of scale in which my invention is embodied. Fig. 2 is a rear view of the operative mechanism of the scale. Fig. 3 is a sectional side view of an inclined dial scale showing another embodiment of the invention.

Referring particularly to Figs. 1 and 2 of the drawings, $a$ is the base supporting the casing $b$ which is attached thereto and which contains the operative mechanism of the scale.

$c$ is the dial and $d$ the pointer actuated by rack and pinion mechanism in a well known manner.

The usual operative mechanism of a scale of this type comprises a saddle 10 fixed in position in the rear of the casing, a platform frame 11 projecting through top of the casing and to which the platform 12 is secured, a lever frame 13 extending between the upper end of the saddle member and the platform frame and pivotally attached to both, a connecting rod 14 extending between the lower part of the saddle and the lower part of the platform frame and pivotally connected to both and a balance spring 15, having its lower end attached to the platform frame and its upper end supported by a fixed part, as the top of the casing, with means as the threaded stud 16 and the thumb nut 17, for adjusting the tension of the spring.

It is an essential in the construction of the operative mechanism of a scale of this character that the lever frame and connecting rod should be positioned and maintained in parallelism with one another. Heretofore the ends of these two members had been connected with the saddle and platform frame by pintles and pivot pins, accurate drilling of the various parts and fitting of the pintles and pivots being relied upon to establish the correct relation between the lever frame and connecting rod. It is obvious that by these methods it has been very difficult to correctly position the various parts of the operative mechanism.

By my invention I provide and adjustable mechanism by means of which the parallelism of the lever frame and connecting rod can be established accurately after the parts of the operative mechanism are assembled. In the embodiment of the invention illustrated in Figs. 1 and 2, I have shown this adjusting mechanism as located at the point of attachment of the connecting rod to the saddle. The saddle is provided with a transverse bar 20, having an apertured boss 21 through which a threaded stud 22 extends engaged by nuts above and below the boss, the head of the stud being bifurcated, as at 23, to receive the end of the connecting rod 13, which is secured in place by the pivot pin 24. It will thus be seen that by loosening one of these nuts and operating the other, the stud can be raised or lowered and the connecting rod brought into proper position and relation with respect to the lever frame, and then locked against accidental displacement. It is apparent that this adjustable connection could well be located at either point of attachment of the lever frame or connecting rod with the saddle or platform frame, but it is advisable to so locate it that it will be readily accessible.

In the modification shown in Fig. 3 the form of the rear end of the connecting rod is altered and the pintle 30 is carried in a frame 31, which slides between the sides of the saddle, the central part of the frame having a lip 32 into which the adjusting screw 33 is threaded.

It is apparent that the device is susceptible of embodiment in other forms without departing from the spirit of my invention.

I claim as my invention:

1. The combination with a weighing mechanism including two pairs of parallelly disposed members, and pivotal connections between the members of one pair and those of the other, of means mounted on one member of one pair for adjusting the pivotal connection with it of one member of the other pair and a casing for said mechanism with respect to which said adjustment is wholly independent.

2. In a weighing scale a fixed saddle, a movable platform frame, a lever frame extending between the saddle and the platform frame and pivotally connected therewith, a stud adjustably supported in said saddle and having a bifurcated head, a connecting rod extending between and pivotally connected with said platform frame and stud head, and a balance spring operatively connected with said platform frame.

3. In a weighing scale a combination with a saddle, a platform frame, a balance spring having a fixed support for one end and connected at its opposite end with said platform frame, a lever frame extending between said saddle and said platform frame and pivotally connected with both, a transverse bar fixed in said saddle near the lower end thereof, an adjusting device carried by said bar, a vertically movable member connected with and operated by said adjusting device and a connecting rod extending between said platform frame and said vertically movable member and pivotally connected with both.

GEORGE WALKER.

Witnesses:
CHARLES WIEGAND,
R. C. CLAPP.